(12) United States Patent
Taylor et al.

(10) Patent No.: US 9,873,198 B2
(45) Date of Patent: Jan. 23, 2018

(54) ACTIVE VIBRATION DAMPING DEVICE

(71) Applicant: The Johns Hopkins University, Baltimore, MD (US)

(72) Inventors: Russell H. Taylor, Severna Park, MD (US); Kevin C. Olds, Baltimore, MD (US); Guillaume Arvin, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 96 days.

(21) Appl. No.: 14/506,878

(22) Filed: Oct. 6, 2014

(65) Prior Publication Data

US 2016/0096271 A1 Apr. 7, 2016

(51) Int. Cl.
B25J 9/16 (2006.01)

(52) U.S. Cl.
CPC ........... B25J 9/1628 (2013.01); B25J 9/1694 (2013.01); *Y10S 901/09* (2013.01); *Y10S 901/46* (2013.01)

(58) Field of Classification Search
CPC ....... B25J 9/1628; B25J 9/1694; B25J 19/028
See application file for complete search history.

(56) References Cited

U.S. PATENT DOCUMENTS

| | | | |
|---|---|---|---|
| 5,333,819 A * | 8/1994 | Stetson, Jr. | ............ B64G 1/285 188/378 |
| 5,742,145 A | 4/1998 | Khorrami et al. | |
| 5,796,229 A | 8/1998 | Akeel | |
| 6,238,384 B1 * | 5/2001 | Peer | ...................... A61B 17/062 128/898 |
| 7,170,250 B2 | 1/2007 | Brenner | |
| 7,689,320 B2 | 3/2010 | Prisco et al. | |
| 8,452,449 B2 * | 5/2013 | Iida | ........................ B25J 9/1638 156/750 |
| 8,706,429 B2 | 4/2014 | Nakajima | |
| | | (Continued) | |

OTHER PUBLICATIONS

Bachta et al., "Cardiolock: An Active Cardiac Stabilizer, First in Vivo Experiments Using a New Robotized Device" *MICCAI 1 vol. 4791 of Lecture Notes in Computer Science*, p. 78-85. Springer, 2007.

(Continued)

*Primary Examiner* — Nicholas Kiswanto
(74) *Attorney, Agent, or Firm* — Johns Hopkins Technology Ventures

(57) ABSTRACT

According to some embodiments of the present invention, a cooperatively-controlled robot includes a robotic actuator assembly comprising a tool holder and a force sensor. The cooperatively-controlled robot further includes a control system adapted to communicate with the robotic actuator assembly and the force sensor, and an actuator in communication with the control system and mechanically coupled to a tool. The force sensor is configured to detect a vibrational force applied on the tool and send a signal to the control system based on the vibrational force. The control system is configured to receive the signal and determine a force to apply to the tool to damp the vibrational force. The control system then signals to the actuator to apply the determined force, and the actuator applies the determined force to actively damp a vibration of the tool.

20 Claims, 3 Drawing Sheets

(56) References Cited

U.S. PATENT DOCUMENTS

| | | | |
|---|---|---|---|
| 2007/0135735 A1* | 6/2007 | Ellis | A61B 5/11 600/587 |
| 2011/0004343 A1* | 1/2011 | Iida | B25J 9/1638 700/253 |
| 2012/0026180 A1* | 2/2012 | Kuchenbecker | G06F 3/016 345/582 |
| 2012/0296471 A1* | 11/2012 | Inaba | B25J 9/163 700/253 |
| 2013/0131867 A1* | 5/2013 | Olds | B25J 9/0051 700/260 |
| 2014/0039678 A1* | 2/2014 | Motoyoshi | B25J 9/1694 700/258 |
| 2014/0067120 A1* | 3/2014 | Gomi | B25J 9/1638 700/254 |
| 2016/0030240 A1* | 2/2016 | Gonenc | G01L 5/226 604/95.01 |

OTHER PUBLICATIONS

El-said et al., "Modular Adaptronic Active 3DOF Stiffness/Damping Element: Design and Control" *International Conference on Noise and Vibration Engineering*, Sep. 2010, pp. 295-308.

MacLachlan et al., "Micron: an Actively Stabilized Handheld Tool for Microsurgery" *IEEE Transactions on Robotics*, vol. 28, No. 1, pp. 195-212, Feb. 2012.

International Search Report and Written Opinion issued in PCT Application No. PCT/US2015/054024, dated Jan. 20, 2016.

\* cited by examiner

ACTIVE VIBRATION DAMPING DEVICE

BACKGROUND

1. Technical Field

The field of the currently claimed embodiments of this invention relates to robotic systems, and more particularly to an active vibration damping device for use in cooperative control robotic systems and to cooperative control robotic systems that include an active vibration damping device.

2. Discussion of Related Art

Robots are often used during medical procedures, in some cases to reduce unwanted motion of the surgeon's hand due to physiological tremor. Many steady hand robots, such as those shown in FIG. 1, use a cooperative control method in which the robot and the user both hold a tool, and the robot moves according the force that the user exerts on the tool. The tool may attach to the robot using a quick release tool holder, which allows for easy exchange of different tools, and fast removal of a tool in the case of an emergency. In this configuration, different kinds of vibrations may appear at the extremity of the tool, either because of induced vibrations created by the robot's motors or because of shocks that could be produced during the surgical procedures. For example, the tool may bump into or suddenly lose contact with sample tissue, inducing vibrations. The tool is highly sensitive to vibrational forces due to its low stiffness and cantilever configuration.

Although significant research has been devoted to developing active vibration damping devices, the existing devices are either complex, active damping devices using linear actuators,[1,2,3] or address only one-dimensional vibration damping of a rectangular cross section cantilever beam.[4,5]

SUMMARY

According to some embodiments of the present invention, a cooperatively-controlled robot includes a robotic actuator assembly comprising a tool holder and a force sensor. The cooperatively-controlled robot further includes a control system adapted to communicate with the robotic actuator assembly and the force sensor, and an actuator in communication with the control system and mechanically coupled to a tool. The force sensor is configured to detect a vibrational force applied on the tool and send a signal to the control system based on the vibrational force. The control system is configured to receive the signal and determine a force to apply to the tool to damp the vibrational force. The control system then signals to the actuator to apply the determined force, and the actuator applies the determined force to actively damp a vibration of the tool.

According to some embodiments of the present invention, an active vibration damping system for use with a cooperatively controlled robot includes a control system adapted to communicate with a robotic actuator assembly and a force sensor, and an actuator in communication with the control system and mechanically coupled to a tool. The force sensor is configured to detect a vibrational force applied on the tool and send a signal to the control system based on the vibrational force. The control system is configured to receive the signal and determine a force to apply to the tool to damp the vibrational force. The control system signals to the actuator to apply the determined force, and the actuator applies the determined force to actively damp a vibration of the tool.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

Figure 1:
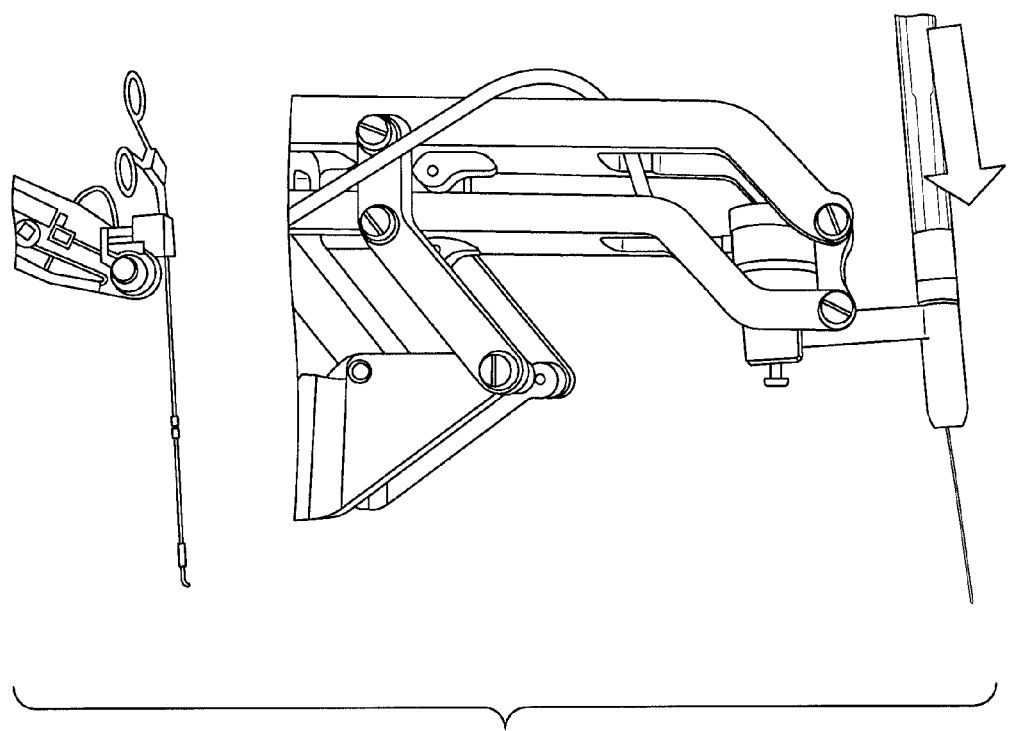
FIG. 1 shows tools inserted into tool holders of two steady hand robots.
Figure 2:
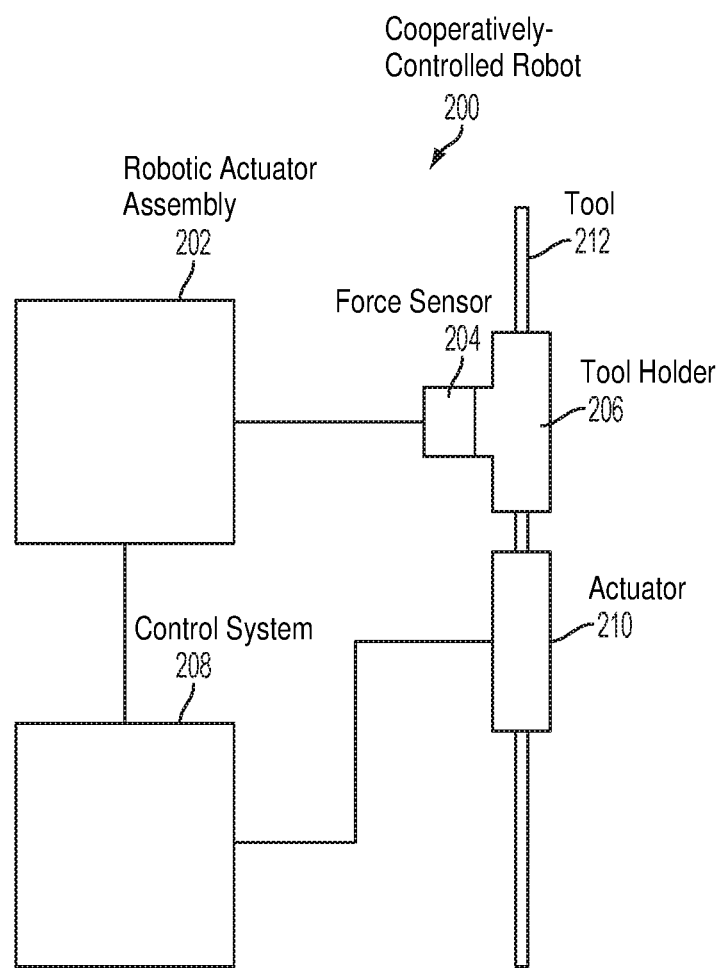
FIG. 2 is a schematic illustration of a cooperatively-controlled robot according to an embodiment of the invention.

FIG. 2 is a schematic illustration of a cooperatively-controlled robot according to an embodiment of the invention. The cooperatively-controlled robot 200 includes a robotic actuator assembly 202 comprising a tool holder 206 and a force sensor 204. The cooperatively-controlled robot 200 further includes a control system 208 adapted to communicate with the robotic actuator assembly 202 and the force sensor 204, and an actuator 210 in communication with the control system 208 and mechanically coupled to a tool 212. The force sensor 204 is configured to detect a vibrational force applied on the tool 212 and send a signal to the control system 208 based on the vibrational force. The control system 208 is configured to receive the signal and determine a force to apply to the tool 212 to damp the vibrational force. The control system 208 is further configured to signal to the actuator 210 to apply the determined force, and the actuator 210 is configured to apply the determined force to actively damp the vibration of the tool 212.

The actuator 210 is able to exert a force on the tool 212. For example, the actuator 210 may expand or contract, exerting a torque on the tool shaft that depends on the length of the actuator 210. Other methods for exerting a force on the tool are also possible. The control system 208 determines a magnitude, direction, and frequency of a vibrational force applied to the tool 212. For example, if the end of the tool 212 abruptly loses contact with a section of sample tissue, the sudden release of tension in the tool shaft can induce vibration of the tool 212. The force sensor 204 detects the vibration, and the control system 208 determines a corresponding force required to damp the vibration. If the actuator 210 is only able to exert a force/torque in a single plane, the control system may determine the force required to damp the vibrations in that plane. The control system 208 signals to the actuator to exert the damping force. In response, the actuator 210 exerts a force or torque that creates a deflection at the free extremity of the tool 212 in the opposite direction of the initial deflection of the shaft produce by the vibrations.

In operation, a surgeon or other user may grasp the tool 212 and/or tool holder 206. When the user applies a force to the tool 212 and/or tool holder 206, a force/torque sensor 204 in the robotic actuator assembly 202 senses the applied force and the robotic actuator assembly 202 moves in response to the applied force. The term "cooperative control" is intended to refer to a robotic system in which the user interacts directly with at least a portion of the robotic actuator assembly so that the robot effectively assists the user in performing certain operations. The cooperatively-controlled robot 200 assists the user by damping unintended vibrations of the tool 212.

According to an embodiment of the invention, an active vibration damping system may be provided for use with a separately-provided cooperatively controlled robot. The active vibration damping system includes a control system 208 adapted to communicate with a robotic actuator assembly 202 and a force sensor 204, and an actuator 210 in communication with the control system 208 and mechanically coupled to a tool 212. The force sensor 204 is configured to detect a vibrational force applied on the tool 212 and send a signal to the control system 208 based on the vibrational force. The force sensor 204 determines the magnitude, direction, and frequency of the vibrational force, and communicates this information to the control system 208. The control system 208 is configured to receive the signal and determine a force to apply to the tool 212 to damp the vibrational force. The control system 208 is configured to signal to the actuator 210 to apply the determined force, and the actuator 210 is configured to apply the determined force to actively damp a vibration of the tool 212.

Figure 3:
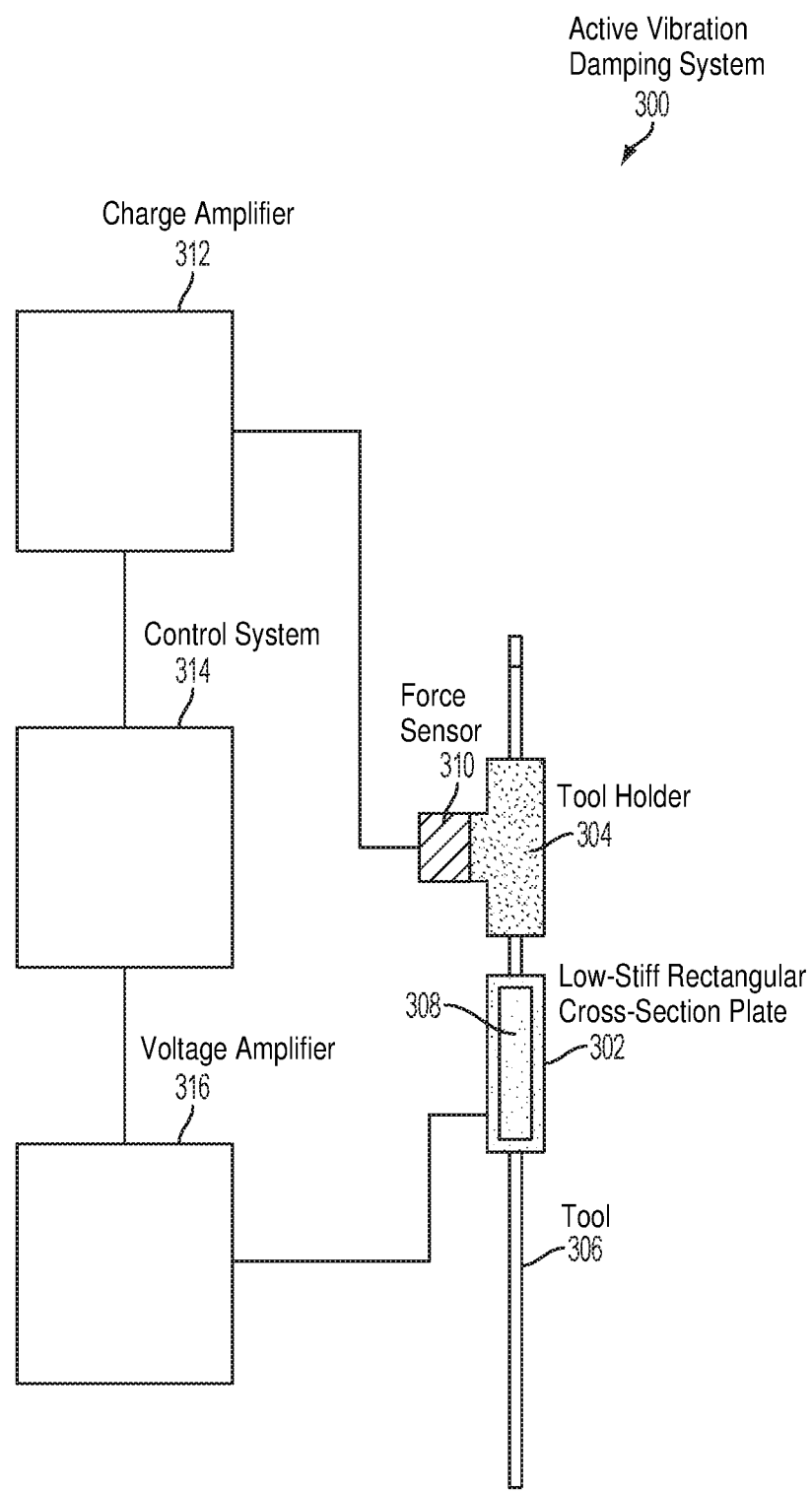
FIG. 3 is a schematic illustration of an active damping system according to an embodiment of the invention.

The actuator 210 may be any type of actuator that can damp high-frequency vibrations. Examples of actuators include, but are not limited to, an electric motor, a solenoid, a voice coil, a piezoelectric actuator, a piezoelectric bender actuator, or another type of piezo actuator. While the robotic actuator assembly could conceivably be used to damp the vibrations, the vibration frequency may be too high for the robotic actuator assembly to counter, necessitating the external actuator. FIG. 3 shows a schematic illustration of the active damping system according to an embodiment of the invention. The active vibration damping system 300 includes a low-stiff rectangular cross-section plate 302 that is fixed either to the tool holder 304 or directly to the tool 306 and is in contact along its entire length with the tool shaft. A piezoelectric bender actuator 308 is patched to the rectangular cross section plate. The piezoelectric bender actuator 308 may be patched to the rectangular cross-section plate 302 using a glue commonly sold by piezoelectric actuator suppliers.

The active vibration damping system 300 may also include a charge amplifier 312 electrically connected to a force sensor 310 and a control system 314. When a vibrational force is applied to the tool, the charge amplifier 312 receives a current signal from the force sensor 310 and sends a voltage signal to the control system 314. The control system 314 determines a force to apply to the tool to damp the vibrational force based on the voltage signal. The control system 314 sends a voltage signal to a voltage amplifier 316 that is electrically connected to the piezoelectric bender actuator 308. The voltage amplifier 316 sends an amplified voltage signal to the piezoelectric bender actuator 308, which applies a force to the tool 306 to damp the vibration.

In order to damp the vibration at the free extremity of the tool, the piezoelectric bender actuator exerts a torque that creates a deflection at the free extremity of the tool in the opposite direction of the initial deflection of the shaft produce by the vibrations. The piezoelectric bender actuator may be positioned on a part of the tool shaft close to the tool holder, though it is not limited to this position. The active vibration damping system 300 shown in FIG. 3 damps lateral vibration of the shaft along one axis. The active vibration damping system can be extended, however, without limitation. For example, the system may perform bi-dimensional vibration damping using two piezoelectric actuators instead of one. The two actuators may be positioned in perpendicular planes, and may be used to damp vibrational forces along the perpendicular planes. The force sensor senses forces in three dimensions, and the control system may determine what damping forces to apply based on the position of the actuator(s). If two or more actuators are used, the control system may signal for each actuator to apply a different force, based on the direction of the vibrational force detected by the force sensor, and the orientation of the actuators.

As described above, cooperatively controlled robots are generally configured for both the robot and the user to hold a tool, and for the robot to move according to the force that the user exerts on the tool. Accordingly, the control system may need to distinguish between a force intentionally applied by a user, and an unwanted induced vibration, perhaps from the robot's motors or the tool's interaction with a specimen. The control system may be configured to determine whether a force detected by the force sensor has a vibrational frequency that exceeds a pre-determined value, or falls within a pre-determined range. For example, a threshold frequency of 8 Hz may be applied, though other values could be chosen, depending on the tool and the cooperatively-controlled robot being used. According to other embodiments of the invention, an algorithm may be applied to determine a range of frequencies for which vibrations should be damped. If the control system receives a signal from the force sensor and determines that the vibrational force has a frequency that is greater than the threshold frequency, the control system may signal to the actuator to apply a non-zero force to the tool to damp the vibration. If the control system determines that the detected vibrational force has a frequency that is less than the threshold frequency, the control system may signal to the actuator to apply no force to the tool to damp the vibration. Alternatively, a filter may be used to isolate the vibrations detected by the force sensor that fall within a pre-defined range, and the control system may instruct the actuator to apply a force that damps only the vibrations that pass through the filter. For example, a high-pass filter may be applied so that only high-frequency vibrations of the tool are damped.

Although the control system may be configured to selectively damp vibrations, the cooperatively controlled robot and active vibration damping system described herein are able to damp any type of vibration having a frequency lower than the resonant frequency of the piezoelectric bender actuator. The piezoelectric bender actuator generally has a high resonant frequency, over 300 Hz, allowing for high-frequency vibrations to be damped. The active vibration damping system described herein has a very short response time, and is cheaper and easier to implement and tune than the existing damping devices.

REFERENCES

[1] Robert A. MacLachlan, Brian C. Becker, Jaime Cuevas Tabarés, Gregg W. Podnar, Louis A. Lobes, Jr., and Cameron N. Riviere, "Micron: an Actively Stabilized Handheld Tool for Microsurgery" *IEEE Transactions on Robotics*, vol. 28, No. 1, pp. 195-212, February 2012.

[2] M. El-said, F. Al-Bender, H. Van Brussel, K. U. Leuven "Modular Adaptronic Active 3DOF Stiffness/Damping Element: Design and Control" *International Conference on Noise and Vibration Engineering*, September 2010.

[3] Wael Bachta, Pierre Renaud, Edouard Laroche, Jacques Gangloff and Antonello Forgione, "Cardiolock: An Active Cardiac Stabilizer, First in Vivo Experiments Using a New Robotized Device" *MICCAI* 1 *volume* 4791 *of Lecture Notes in Computer Science*, page 78-85. Springer, 2007

[4] André Preumont, "Vibration Control of Active Structures: An Introduction."

[5] S. O. Reza Moheimni, Dunant Halim and Andrew J. Fleming, "Spatial Control of Vibration: Theory and Experiments."

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A cooperatively-controlled robot, comprising:
a robotic actuator assembly comprising a tool holder and a force sensor;
a control system adapted to communicate with said robotic actuator assembly and said force sensor;
a rectangular cross-section plate configured to be in contact with a shaft of a tool along an entire length of the low-stiff rectangular cross-section plate;
an actuator in communication with said control system and coupled to the rectangular cross-section plate, wherein said force sensor is configured to detect a vibrational force applied on said tool and send a signal to said control system based on said vibrational force, wherein said control system is configured to receive said signal and determine a force to apply to said tool to damp said vibrational force, wherein said control system is configured to signal to said actuator to apply said determined force, and
wherein said actuator is configured to apply said determined force to actively damp a vibration of said tool.

2. A cooperatively-controlled robot according to claim 1, wherein said actuator is a piezoelectric actuator.

3. A cooperatively-controlled robot according to claim 1, wherein said actuator is an electric motor.

4. A cooperatively-controlled robot according to claim 1, wherein said actuator is a voice coil.

5. A cooperatively-controlled robot according to claim 1, wherein said actuator is a solenoid.

6. A cooperatively-controlled robot according to claim 1, further comprising:
a second actuator in communication with said control system, wherein said first and second actuators are positioned on a first axial plane and a second axial plane, respectively, of said tool,
wherein said first axial plane and said second axial plane are perpendicular to each other, wherein said control system is configured to determine a second force to apply to said tool to damp said vibrational force,
wherein said second force is perpendicular to said first force, wherein said control system is configured to signal to said second actuator to apply said determined second force, and wherein said second actuator is configured to apply said determined second force to actively damp said vibration of said tool.

7. A cooperatively-controlled robot according to claim 1, further comprising:
a charge amplifier electrically connected to said force sensor and said control system,
wherein said charge amplifier is configured to receive a current signal from said force sensor and send a voltage signal to said control system, wherein said control system is configured to determine a force to apply to said tool to damp said vibrational force based on said voltage signal.

8. A cooperatively-controlled robot according to claim 1, further comprising:
a voltage amplifier in communication with said control system and electrically connected to said actuator, wherein said voltage amplifier is configured to receive a voltage signal from said control system, and send an amplified voltage signal to said actuator.

9. A cooperatively-controlled robot according to claim 1, wherein said control system is configured to determine to apply a force that is greater than zero on a condition that a frequency of said detected vibrational force is greater than a pre-determined value.

10. A cooperatively-controlled robot according to claim 1, further comprising:
a filter electrically connected to said force sensor and in communication with said control system, wherein said filter is configured to receive a signal from said force sensor based on said vibrational force, and send to said control system a portion of said signal having a frequency within a pre-defined range of frequencies.

11. An active vibration damping system for use with a cooperatively controlled robot, comprising:
a control system adapted to communicate with a robotic actuator assembly and a force sensor;
a rectangular cross-section plate configured to be in contact with a shaft of a tool along an entire length of the low-stiff rectangular cross-section plate;
an actuator in communication with said control system and coupled to the rectangular cross-section plate, wherein said force sensor is configured to detect a vibrational force applied on said tool and send a signal to said control system based on said vibrational force,
wherein said control system is configured to receive said signal and determine a force to apply to said tool to damp said vibrational force,
wherein said control system is configured to signal to said actuator to apply said determined force, and
wherein said actuator is configured to apply said determined force to actively damp a vibration of said tool.

12. An active vibration damping system according to claim 11, wherein said actuator is a piezoelectric actuator.

13. An active vibration damping system according to claim 11, wherein said actuator is an electric motor.

14. An active vibration damping system according to claim 11, wherein said actuator is a voice coil.

15. An active vibration damping system according to claim 11, wherein said actuator is a solenoid.

16. An active vibration damping system of claim 11, further comprising:

a second actuator in communication with said control system, wherein said first and second actuators are positioned on a first axial plane and a second axial plane, respectively, of said tool, wherein said first axial plane and said second axial plane are perpendicular to each other, wherein said control system is configured to determine a second force to apply to said tool to damp said vibrational force, wherein said second force is perpendicular to said first force, wherein said control system is configured to signal to said actuator to apply said determined second force, and wherein said second actuator is configured to apply said determined second force to actively damp said vibration of said tool.

17. An active vibration damping system according to claim 11, further comprising:

a charge amplifier electrically connected to said force sensor and said control system, wherein said charge amplifier is configured to receive a current signal from said force sensor and send a voltage signal to said control system, wherein said control system is configured to determine a force to apply to said tool to damp said vibrational force based on said voltage signal.

18. An active vibration damping system according to claim 11, further comprising:

a voltage amplifier in communication with said control system and electrically connected to said actuator, wherein said voltage amplifier is configured to receive a voltage signal from said control system, and send an amplified voltage signal to said actuator.

19. An active vibration damping system according to claim 11, wherein said control system is configured to determine to apply a force that is greater than zero on a condition that a frequency of said detected vibrational force is greater than a pre-determined value.

20. An active vibration damping system according to claim 11, further comprising:

a filter electrically connected to said force sensor and in communication with said control system, wherein said filter is configured to receive a signal from said force sensor based on said vibrational force, and send to said control system a portion of said signal having a frequency within a pre-defined range of frequencies.

* * * * *